(12) United States Patent
Cimatti

(10) Patent No.: US 10,675,964 B2
(45) Date of Patent: Jun. 9, 2020

(54) ROAD VEHICLE WITH AN ELECTRIC DRIVE

(71) Applicant: Ferrari S.p.A., Modena (IT)

(72) Inventor: Franco Cimatti, Pavullo (IT)

(73) Assignee: Ferrari S.p.A., Modena (IT)

( * ) Notice: Subject to any disclaimer, the term of this patent is extended or adjusted under 35 U.S.C. 154(b) by 764 days.

(21) Appl. No.: 15/273,961

(22) Filed: Sep. 23, 2016

(65) Prior Publication Data

US 2017/0087975 A1    Mar. 30, 2017

(30) Foreign Application Priority Data

Sep. 24, 2015  (IT) .................. 102015000054742

(51) Int. Cl.
*B60K 6/36* (2007.10)
*B60K 6/547* (2007.10)
(Continued)

(52) U.S. Cl.
CPC .............. *B60K 6/547* (2013.01); *B60K 6/36* (2013.01); *B60K 6/38* (2013.01); *B60K 6/48* (2013.01); *B60K 17/02* (2013.01); *B60K 25/00* (2013.01); *B60K 25/06* (2013.01); *F16H 3/006* (2013.01); *F16H 3/093* (2013.01); *F16H 3/10* (2013.01); *F16H 57/0441* (2013.01); *F16H 61/30* (2013.01); *B60K 17/26* (2013.01); *B60K 25/02* (2013.01); *B60K 2025/005* (2013.01); *B60Y 2200/92* (2013.01); *B60Y 2400/42* (2013.01); *B60Y 2400/70* (2013.01); *F16D 41/00* (2013.01); *F16H 2200/0013* (2013.01);
(Continued)

(58) Field of Classification Search
CPC ............. F16H 57/0434; F16H 57/0439; F16H 57/0441; B60K 6/547; B60K 6/36; B60K 6/38; B60K 6/48; B60K 25/00; B60K 25/02; B60K 25/06; B60K 2025/022
USPC .................................................. 74/330, 661
See application file for complete search history.

(56) References Cited

U.S. PATENT DOCUMENTS 4,502,350 A * 3/1985 Polak .................. F16H 61/0028
475/136
5,823,282 A * 10/1998 Yamaguchi .............. B60K 1/00
180/65.235

(Continued)

FOREIGN PATENT DOCUMENTS

EP          2 325 034 A1     5/2011
JP          07-167261    *    7/1995
WO    WO 2012/085613 A1     6/2012

*Primary Examiner* — William C Joyce
(74) *Attorney, Agent, or Firm* — Blank Rome LLP

(57) ABSTRACT

A road vehicle with an electric drive having: a heat engine provided with a carrier shaft; a gearbox; at least one pump actuated by a carrier shaft; at least a reversible electric machine; a first mechanical transmission, which transmits the motion from the drive shaft of the heat engine to the carrier shaft and is provided with a first freewheel; a second mechanical transmission, which transmits the motion from the shaft of the electric machine to the carrier shaft and is provided with a second freewheel; and a third mechanical transmission, which is arranged in parallel to the second mechanical transmission, transmits the motion from the shaft of the electric machine to the carrier shaft, is provided with a third freewheel and reverses the direction of motion with respect to the second mechanical transmission.

13 Claims, 4 Drawing Sheets

(51) Int. Cl.
*B60K 25/06* (2006.01)
*B60K 17/02* (2006.01)
*B60K 6/48* (2007.10)
*B60K 25/00* (2006.01)
*B60K 6/38* (2007.10)
*F16H 3/00* (2006.01)
*F16H 3/093* (2006.01)
*F16H 3/10* (2006.01)
*F16H 57/04* (2010.01)
*F16H 61/30* (2006.01)
*B60K 17/26* (2006.01)
*B60K 25/02* (2006.01)
*F16D 41/00* (2006.01)

(52) U.S. Cl.
CPC ............... *F16H 2200/0021* (2013.01); *F16H 2200/0056* (2013.01); *Y10S 903/909* (2013.01); *Y10S 903/912* (2013.01); *Y10S 903/919* (2013.01)

(56) References Cited

U.S. PATENT DOCUMENTS

| | | | |
|---|---|---|---|
| 8,863,618 B2* | 10/2014 | Kubo | B60K 6/48 74/661 |
| 2008/0179119 A1 | 7/2008 | Grenn et al. | |
| 2008/0194369 A1* | 8/2008 | Boutou | B60K 6/365 475/5 |
| 2011/0017015 A1* | 1/2011 | Cimatti | B60K 6/48 74/665 R |
| 2011/0252906 A1* | 10/2011 | Harashima | F01C 17/02 74/325 |
| 2015/0167820 A1* | 6/2015 | Hedman | F16H 3/0915 74/404 |

* cited by examiner

ROAD VEHICLE WITH AN ELECTRIC DRIVE

TECHNICAL FIELD

The present invention relates to a road vehicle with an electric drive.

The present invention finds advantageous application in a road vehicle with hybrid drive (i.e. both thermal and electric), to which the following discussion will make explicit reference without loss of generality.

PRIOR ART

A hybrid vehicle comprises an internal combustion engine, which transmits the drive torque to the drive wheels by means of a transmission provided with a gearbox coupled to a clutch, and at least one electric machine, which is electrically coupled to an electrical storage system and mechanically coupled to the driving wheels.

The vehicle can be run by: thermal traction, wherein the drive torque is generated only by the heat engine and possibly the electric machine operates as a generator to recharge the electrical storage system; electric traction, wherein the engine is off and the drive torque is generated only by the electric machine operating as an engine; or combined traction, wherein the drive torque is generated both by the heat engine and by the electric machine operating as an engine. Moreover, to increase the overall energy efficiency, in all deceleration stages the electric machine is used as a generator to produce a regenerative deceleration in which the kinetic energy possessed by the vehicle, instead of being completely dissipated in friction, is at least partly converted in electrical energy that is stored in the electrical storage system.

In some hybrid vehicles, the transmission comprises a circulation pump, which allows the circulation of a lubrication oil through the transmission gears to ensure an adequate lubrication to the gears. In addition, in the case of a hydraulic power-assisted (i.e. robotized) transmission, the transmission also comprises an implementation pump that supplies the hydraulic pressure required to operate the hydraulic actuators for engaging and selecting the gear and controlling the clutch.

In currently produced vehicles, the transmission pumps are driven by an auxiliary carrier shaft, which is operated by the drive shaft (hence upstream of the clutch) to be always operated, even when the clutch is open. This structure makes less convenient the mechanical coupling of an electric machine to a gear shaft, since in the case of the electric traction (i.e. when the engine is off), the clutch must remain closed to actuate the transmission pumps, and therefore also the heat engine is rotated (with considerable friction and inertia).

To solve the aforesaid problem, it has been proposed that the carrier shaft of the transmission pumps is mechanically independent from the drive shaft and the carrier shaft of the transmission pumps is operated by a dedicated electric motor. However, this solution is energetically scarcely efficient, because when the heat engine is on (i.e. for most of the time of use of the vehicle), it is more efficient using part of the drive torque generated by the heat engine to operate directly some auxiliary elements rather than converting part of the drive torque generated by the heat engine in electrical energy, which is transformed back in mechanical torque by an electric motor. Moreover, arranging an electric motor mechanically coupled to the carrier shaft of the transmission pumps is not simple, since the area of the transmission has reduced free space, is quite hot because of the heat generated by the friction inside the clutch and the gearbox, and is scarcely ventilated since it is normally arranged at the centre of the vehicle.

To increase the energy efficiency in the case of the electric traction (i.e. when the heat engine is off), the patent applications EP2278192A1 and EP2325034A1 propose to connect the carrier shaft of the transmission pumps both to the drive shaft, by means of a first mechanical transmission provided with a first freewheel, and to the shaft of the electric machine by means of a second mechanical transmission provided with a second freewheel. In this way, when the heat engine is on, the heat engine rotates the carrier shaft of the transmission pumps while the electric machine is released (thanks to the corresponding freewheel) from the carrier shaft; on the other hand, when the heat engine is off, the electric machine directly rotates the carrier shaft of the transmission pumps while the engine is released (thanks to the corresponding freewheel) from the carrier shaft.

However, the coupling system proposed in the patent applications EP2278192A1 and EP2325034A1 allows the rotation of the carrier shaft of the transmission pumps only when the electric machine rotates in one direction (coinciding with the forward motion) and not when it rotates in the opposite direction (i.e. in reverse gear); this is disadvantageous, as it would be more convenient to operate the reverse gear by means of the electric traction, thus taking advantage of the complete reversibility of the direction of rotation of the electric machine, rather than by means of a suitable transmission gear.

DESCRIPTION OF THE INVENTION

The object of the present invention is to provide a road vehicle with an electric drive that is free from the aforesaid drawbacks and, at the same time, is easy and inexpensive to produce.

According to the present invention, it is provided a road vehicle with an electric drive as claimed in the appended claims.

BRIEF DESCRIPTION OF THE DRAWINGS

The present invention will now be described with reference to the accompanying drawings, showing a non-limiting embodiment, wherein.

PREFERRED EMBODIMENTS OF THE INVENTION

Figure 1:
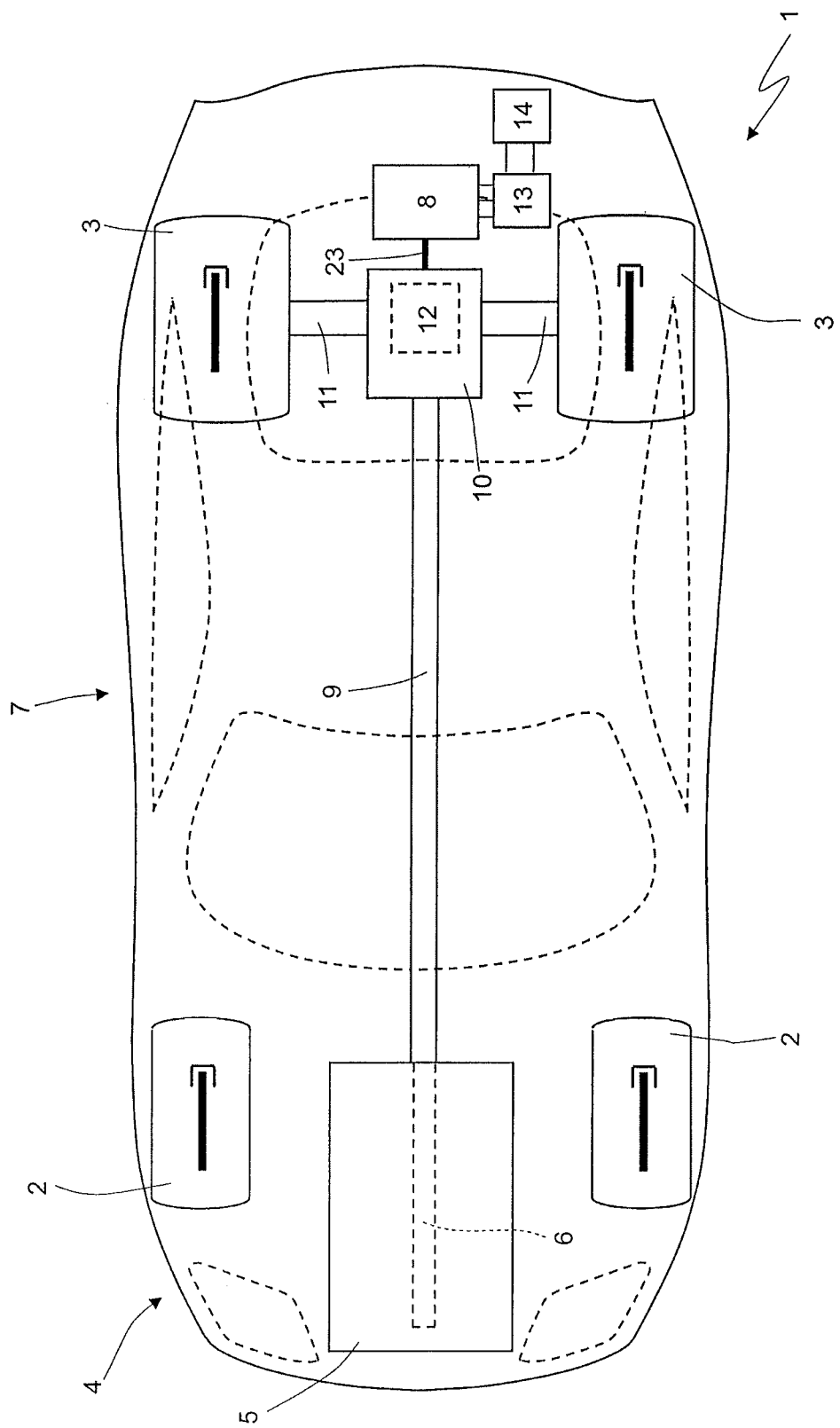
FIG. 1 is a schematic view of a road vehicle with hybrid propulsion manufactured in accordance with the present invention.

In FIG. 1, number 1 indicates as a whole a road vehicle with hybrid propulsion provided with two front wheels 2 and with two rear driving wheels 3, which receive the driving torque by a hybrid powertrain system 4.

The hybrid powertrain system 4 comprises an internal combustion engine 5, which is arranged in a front position and is provided with a crankshaft 6, a hydraulic power-assisted (i.e. robotized) transmission 7, which transmits the drive torque generated by the internal combustion engine 5 to the rear driving wheels 3, and an electric reversible machine 8 (namely operated both as an electric motor by absorbing electricity and generating a mechanical drive torque and as an electrical generator by absorbing mechanical energy and generating electricity), which is mechanically coupled to the transmission 7.

The transmission 7 comprises a transmission shaft 9, which on the one side is angularly integral with the drive shaft 6 and on the other side is mechanically coupled to a dual-clutch gearbox 10, which is arranged in the rear position and transmits the motion to the rear driving wheels 3 by means of two axle shafts 11 receiving the motion from a differential 12. The electric reversible machine 8 is mechanically coupled to the dual-clutch gearbox 10, as it will be better described in the following, and is driven by an electronic power converter 13 coupled to a storage system 14, which stores electrical energy and is provided with chemical batteries and/or supercapacitors.

Figure 2:
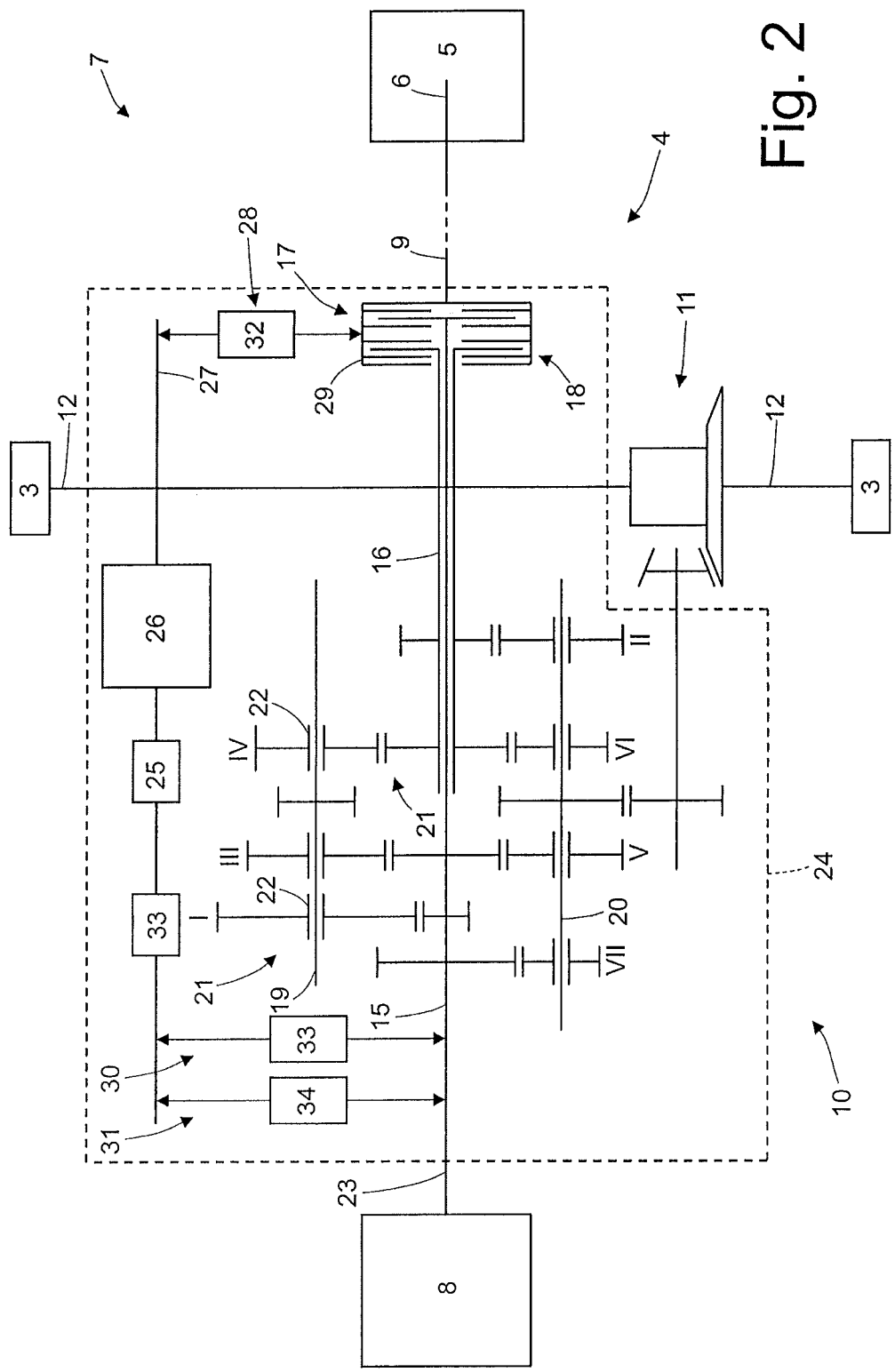
FIG. 2 is a schematic view of a transmission of the road vehicle of FIG. 1.

As shown in FIG. 2, the dual-clutch gearbox 10 comprises two primary shafts 15 and 16 which are mutually coaxial, independent and inserted one in the other, and two clutches 17 and 18, which are coaxial and arranged in series, each of which connects a relative primary shaft 15 or 16 to the transmission shaft 9 (and therefore to the drive shaft 6 of the internal combustion engine 5). Moreover, the dual-clutch gearbox 10 comprises two secondary shafts 19 and 20, which are both angularly integral to the inlet of the differential 11 that transmits the motion to the rear driving wheels 3.

The dual-clutch gearbox 10 shown in FIG. 2 has seven forward gears indicated with Roman numerals (first gear I, second gear II, third gear III, fourth gear IV, fifth gear V, sixth gear VI and seventh gear VII) and lacks a reverse gear (where the reverse motion occurs by electric traction, exploiting the perfect rotation bi-directionality of the electric machine 8); in other words, the electric machine 8 works as a motor, with a direction of rotation opposite to the usual, to apply to the rear driving wheels 3 a drive torque pushing the vehicle 1 in reverse motion. The primary shafts 15 and 16 are mechanically coupled to the secondary shafts 19 and 20 by means of a plurality of pairs of gears 21, each of which defines a respective gear and comprises a primary gear mounted on a primary shaft 15 or 16 and a secondary gear mounted on a secondary shaft 19 or 20 and meshes permanently with the primary gear. To allow the correct operation of the dual-clutch gearbox 10, all the odd gears (first gear I, third gear III, fifth gear V, seventh gear VII) are coupled to the same primary shaft 15, while all the even gears (second gear II, fourth gear IV and sixth gear VI) are coupled to the other primary shaft 16.

Each primary gear is fitted to a respective primary shaft 15 or 16 to always rotate integrally with the primary shaft 15 or 16 and meshes permanently with the respective secondary gear; instead, each secondary gear is idly mounted on its secondary shaft 19 or 20. The dual-clutch gearbox 10 comprises for each pair of gears 21 a corresponding synchronizer 22, which is mounted coaxially to the corresponding secondary shaft 19 or 20 and can be actuated to engage the respective secondary gear to the secondary shaft 19 or 20 (i.e. to make the respective secondary gear angularly integral with the secondary shaft 19 or 20).

The electric machine 8 has a shaft 23, which is permanently coupled to the primary shaft 15 to always rotate integrally with the primary shaft 15. According to a preferred embodiment, starting from an existing dual-clutch gearbox 10, not initially designed for the hybrid drive, the primary shaft 15 is extended on the opposite side with respect to the clutches 17 and 18 so as to protrude from a gearbox 24; then, out of the gearbox 24, the primary shaft 15 is made angularly integral (e.g. by means of a head-to-head coupling) with the shaft 23 of the electric machine 8.

The dual-clutch gearbox 10 comprises a circulation pump 25, which allows the circulation of a lubricant oil through the transmission gears 10 to ensure an adequate lubrication and an adequate cooling of the gears. Moreover, the dual-clutch gearbox 10 comprises an actuating pump 26 that supplies the hydraulic pressure required to operate the hydraulic actuators for engaging the gears (i.e. the actuators of the synchronizers 22) and the control actuators of the clutches 17 and 18.

The two pumps 25 and 26 of the gearbox 10 are actuated by an auxiliary carrier shaft 27 (i.e. passing through each pump 25 and 26), which on the one hand takes the motion through a mechanical transmission 28 from a front basket 29 of the clutches 17 and 18 which is angularly integral with the drive shaft 6, and on the other hand takes the motion through two different mechanical transmissions 30 and 31 from the primary shaft 15, which is angularly integral with the shaft 23 of the electric machine 8. The carrier shaft 27 must always rotate in the same direction, as the pumps 25 and 26 may operate correctly (i.e. may pump) by rotating only in a predetermined direction.

The mechanical transmission 28 is preferably made up of a train of gear wheels and is provided with a freewheel 32 (or idle wheel 32) that transmits or does not transmit the motion (i.e. meshes or not meshes) depending on the direction of the speed difference. The mechanical transmission 30 is preferably made up of a train of gear wheels and is provided with a freewheel 33 (or idle wheel 33) that transmits or does not transmit the motion (i.e. meshes or not meshes) depending on the direction of the speed difference. The mechanical transmission 31 is preferably made up of a train of gear wheels and is provided with a freewheel 34 (or idle wheel 34) that transmits or does not transmit the motion (i.e. meshes or not meshes) depending on the direction of the speed difference and is mounted oppositely with respect to the freewheel 33 (i.e. in an opposite meshing direction if compared to the freewheel 33); in other words, the freewheel 34 transmits the motion (i.e. meshes) when it rotates in a certain direction, whereas the freewheel 33 transmits the motion (i.e. meshes) when it rotates in the opposite direction.

The two mechanical transmissions 30 and 31 are mutually parallel (i.e. both take their motion from the primary shaft 15, which is angularly integral with the shaft 23 of the electric machine 8, and transmit the motion to the auxiliary carrier shaft 27) and differ for the different (opposite) meshing direction of the respective freewheels 33 and 34 and because the one reverses the direction of motion with respect to the other (i.e. if the primary shaft 15 rotates counterclockwise, the mechanical transmission 30 rotates the auxiliary carrier shaft 27 counterclockwise, whereas the mechanical transmission 31 rotates the auxiliary carrier shaft 27 clockwise).

Finally, the two mechanical transmissions 30 and 31 have the same gear ratio (or anyway similar gear ratios), while the gear ratio of the mechanical transmission 28 is higher than the gear ratio of the mechanical transmissions 30 and 31 so that at an equal inlet speed, the mechanical transmission 28 rotates the carrier shaft 27 faster than the mechanical transmissions 30 and 31.

According to a possible embodiment, along the carrier shaft 27 and upstream of the mechanical transmissions 30 and 31 it is interposed an uncoupling sleeve (not shown), which allows an axial sliding of the portion of the carrier shaft 27 arranged to the right of the uncoupling sleeve with respect to the portion of the carrier shaft 27 arranged to the left of the uncoupling sleeve. The purpose of the uncoupling sleeve is to allow the axial adjustment of the mechanical transmissions 30 and 31 (typically to regain the construction tolerances in the assembling phase) without affecting the pumps 25 and 26 and the mechanical transmissions 30 and 31.

Figure 3:
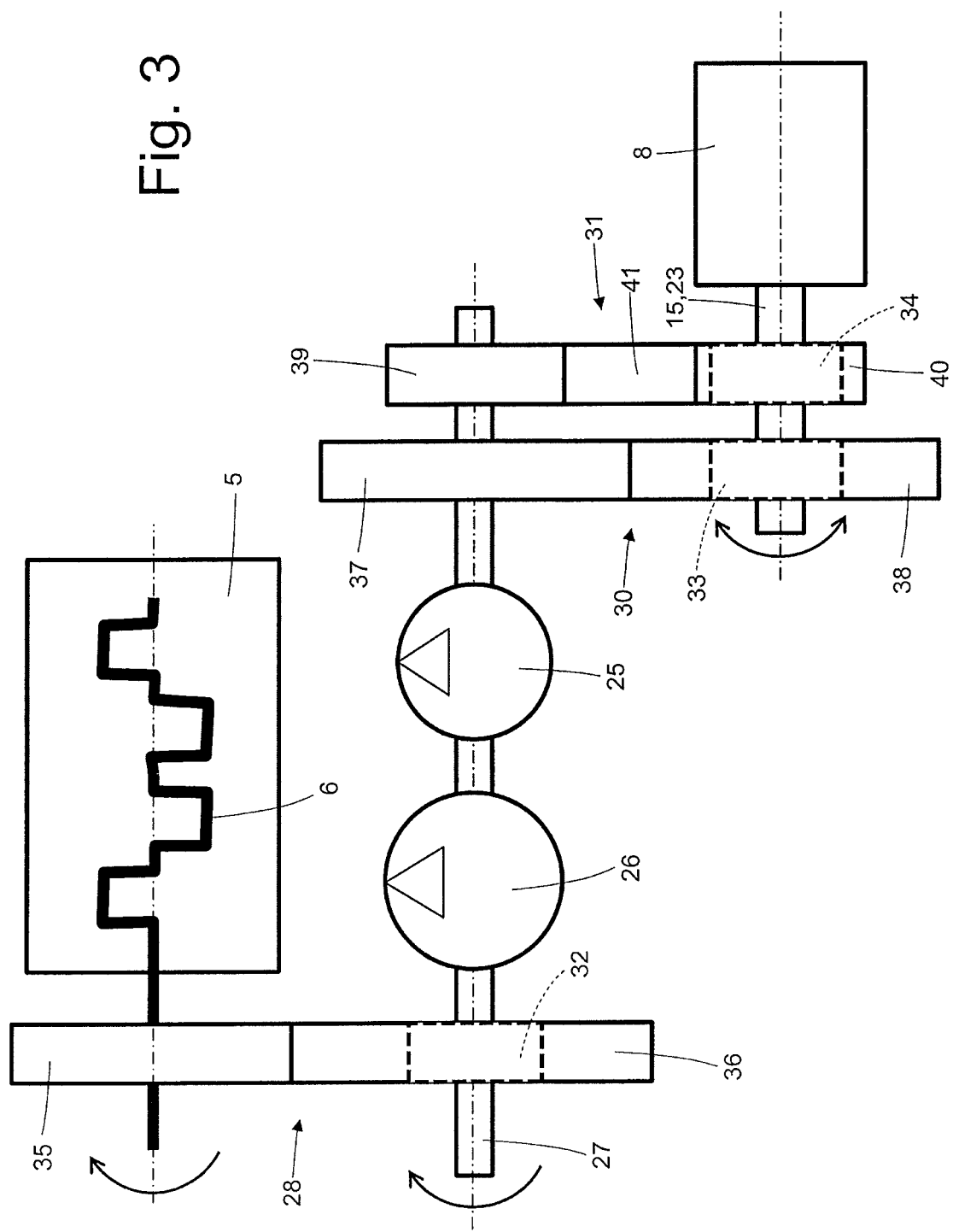
FIGS. 3 and 4 are two different schematic views of part of the transmission of FIG. 2.
Figure 4:
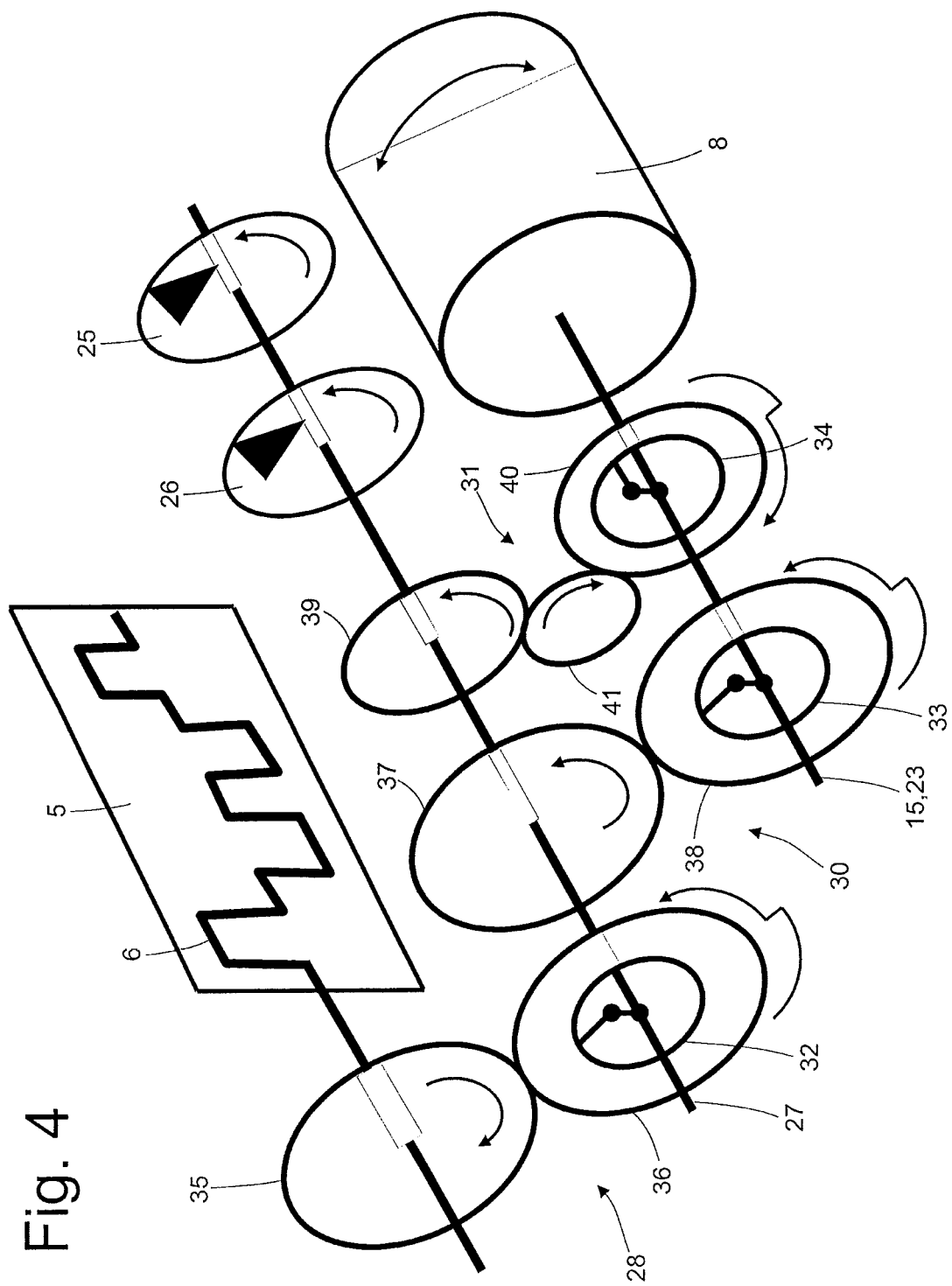

As shown in FIGS. 3 and 4, the mechanical transmission 28 is made up of a train of gear wheels and comprises a gear wheel 35 integral with the front basket 29 of the clutches 17 and 18 (i.e. angularly integral with the drive shaft 6 of the heat engine 5) and a gear wheel 36 which meshes with the gear wheel 35 and is coupled to the carrier shaft 27 through the freewheel 32; in particular, the freewheel 32 is integrated in the gear wheel 36, i.e. forms the hub of the gear wheel 36. The mechanical transmission 30 is made up of a train of gear wheels and comprises a gear wheel 37 integral with the carrier shaft 27 and a gear wheel 38 which meshes with the gear wheel 37 and is coupled to the primary shaft 15 (i.e. to the shaft 23 of the electric machine 8) through the freewheel 33; in particular, the freewheel 33 is integrated in the gear wheel 38, i.e. forms the hub of the gear wheel 38. The mechanical transmission 31 is made up of a train of gear wheels and comprises a gear wheel 39 integral with the carrier shaft 27, a gear wheel 40 which is coupled to the primary shaft 15 (i.e. to the shaft 23 of the electric machine 8) through the freewheel 34, and a further gear wheel 41 that is interposed between the gear wheels 39 and 40 and then meshes on the one side with the gear wheel 39 and on the opposite side with the gear wheel 40; in particular, the freewheel 34 is integrated in the gear wheel 40, i.e. forms the hub of the gear wheel 40.

Thanks to the presence of the gear wheel 41, the mechanical transmission 31 reverses the direction of motion with respect to the mechanical transmission 30; accordingly, if the primary shaft 15 (i.e. the shaft 23 of the electric machine 8) rotates counterclockwise, the mechanical transmission 30 rotates the auxiliary carrier shaft 27 counterclockwise, whereas the mechanical transmission 31 rotates the auxiliary carrier shaft 27 clockwise.

Hereinafter a description of the operation of the transmission 7 with reference to the implementation of the pumps 25 and 26 of the gearbox 10.

When the speed of rotation imparted to the carrier shaft 27 by the mechanical transmission 28 (and therefore by the drive shaft 6 of the heat engine 5) is higher than the speed of rotation imparted to the carrier shaft 27 by the mechanical transmissions 30 and 31 (and therefore by the primary shaft 15 integral with the electric machine 8), then the freewheel 32 meshes and then transmits the motion to the pumps 25 and 26 of the gearbox 10, while the freewheels 33 and 34 are not engaged and therefore do not transmit the motion to the pumps 25 and 26 of the gearbox 10; in other words, the carrier shaft 27 is rotated by the drive shaft 6 of the heat engine 5, while the carrier shaft 27 is isolated from the primary shaft 15 integral with the shaft 23 of the electric machine 8. The speed of rotation imparted to the carrier shaft 27 by the mechanical transmission 28 (and therefore by the drive shaft 6 of the heat engine 5) is always higher than the speed of rotation imparted to the carrier shaft 27 by the mechanical transmissions 30 and 31 (and therefore by the primary shaft 15 integral with the electric machine 8) when the heat engine 5 is on for advancing the vehicle, since the gear ratio of the mechanical transmission 28 is higher than the gear ratio of the mechanical transmissions 30 and 31.

When the speed of rotation imparted to the carrier shaft 27 by the mechanical transmission 28 (and therefore by the drive shaft 6 of the heat engine 5) is lower than the speed of rotation imparted to the carrier shaft 27 by the mechanical transmissions 30 and 31 (and therefore by the primary shaft 15 integral with the electric machine 8), then only one of the two freewheels 33 and 34 meshes and then transmits the motion to the pumps 25 and 26 of the gearbox 10, while the freewheel 32 is not engaged and therefore does not transmit the motion to the pumps 25 and 26 of the gearbox 10 (this almost always occurs only when the heat engine 5 is off during the start/stop phase); in other words, the carrier shaft 27 is rotated by the primary shaft 15 integral with the shaft 23 of the electric machine 8, while the carrier shaft 27 is isolated from the drive shaft 6 of the heat engine 5.

In particular, if the primary shaft 15 integral with the shaft 23 of the electric machine 8 rotates in one direction (when the electric machine 8 is used for the forward motion of the road vehicle 1), then it engages the freewheel 33 and does not engage the freewheel 34 (i.e. the carrier shaft 27 is rotated through the mechanical transmission 30), while if the primary shaft 15 integral to the shaft 23 of the electric machine 8 rotates in the opposite direction (when the electric machine 8 is used for the reverse motion of the road vehicle 1), then it engages the freewheel 34 and does not engage the freewheel 33 (i.e. the carrier shaft 27 is rotated through the mechanical transmission 31); in any case, the carrier shaft 27 always rotates in the same direction regardless of the direction of rotation of the primary shaft 15 integral with the shaft 23 of the electric machine 8, since the two mechanical transmissions 30 and 31 reverse the direction of motion with respect to one another.

In use, when the heat engine 5 is on, i.e. the drive shaft 6 of the heat engine 5 rotates and one of the clutches 17 and 18 is closed, the speed of rotation imparted to the carrier shaft 27 by the mechanical transmission 28 (and therefore by the drive shaft 6 of the heat engine 5) is always higher than the speed of rotation imparted to the carrier shaft 27 by the mechanical transmissions 30 and 31 (and therefore by the primary shaft 15 integral with the shaft 23 of the electric machine 8), since the gear ratio determined by the mechanical transmission 28 is higher than the gear ratio determined by the mechanical transmissions 30 and 31. In this case, the carrier shaft 27 is rotated by the drive shaft 6 of the heat engine 5.

When the heat engine 5 is on, i.e. the drive shaft 6 of the heat engine 5 rotates, and the clutches 17 and 18 are both open, the carrier shaft 27 can be rotated by the drive shaft 6 of the heat engine 5 or can be rotated by the primary shaft 15 integral with the shaft 23 of the electric machine 8 depending on the speed of rotation of the shaft 23 of the electric machine 8 (i.e. of the primary shaft 15 of the gearbox). In fact, since both clutches 17 and 18 are open, the speed of rotation of the primary shaft 15 of the gearbox is completely independent from the rotational speed of the drive shaft 6 of the heat engine 5. In any case, when the heat engine 5 is on, the carrier shaft 27 is preferably rotated by the drive shaft 6 of the heat engine 5; generally, when the heat engine 5 is on, the carrier shaft 27 is rotated by the primary shaft 15 integral with the electric machine 8 only in the case of a regenerative braking, when the electric machine 8 works as a generator to recover the kinetic energy of the vehicle 1.

When the heat engine 5 is off, i.e. when the drive shaft 6 of the heat engine 5 is stationary and the shaft 23 of the electric machine 8 rotates (and therefore when the primary shaft 15 rotates), the speed of rotation imparted to the carrier shaft 27 by the mechanical transmission 28 (and therefore by the drive shaft 6 of the heat engine 5) is always lower than the speed of rotation imparted to the carrier shaft 27 by the mechanical transmissions 30 and 31 (and therefore by the primary shaft 15 integral with the shaft 23 of the electric machine 8). In this case, the carrier shaft 27 is rotated by the primary shaft 15 integral with the shaft 23 of the electric machine 8 through one of the two mechanical transmissions 30 and 31 depending on the direction of rotation of the primary shaft 15 integral with the shaft 23 of the electric machine 8.

When the heat engine 5 is off, i.e. the drive shaft 6 of the heat engine 5 is stationary, and the shaft 23 of the electric machine 8 is stationary too, then also the carrier shaft 27 remains stationary.

In the aforesaid embodiment there are two different pumps 25 and 26; according to other embodiments not shown, there is a single pump mounted on the carrier shaft 27 (e.g. in the case where a single fluid is used for lubrication and implementation), or there are more than two pumps mounted on the carrier shaft 27.

In the aforesaid embodiment, the gearbox 10 is a dual-clutch gearbox; according to other embodiments not shown, the gearbox 10 is a power-assisted single-clutch gearbox, an automatic gearbox or a manual gearbox. In all these possible embodiments, the mechanical transmission 28 derives the motion directly from the drive shaft 6 of the heat engine 5.

In the aforesaid embodiment, the road vehicle 1 has a hybrid propulsion (i.e. both a thermal propulsion and an electric propulsion); according to other embodiments not shown, the road vehicle 1 may have only an electric propulsion and in this case there would no longer be the heat engine 5, the clutches 16 and 17 and the mechanical transmission 28 (but there would be the two mechanical transmissions 30 and 31 to rotate the carrier shaft 27 always in the same direction, regardless of the direction of rotation of the shaft 23 of the electric machine 8).

The aforesaid road vehicle 1 has several advantages.

First of all, the aforesaid road vehicle 1 is simple and inexpensive, particularly starting from an existing transmission that had not been designed for hybrid applications, since the general structure of the gearbox 10, and in particular the position of the pumps 25 and 26 of the gearbox 10, does not change; basically, starting from an existing transmission that had not been designed for hybrid applications, the only necessary modifications are the elongation of the primary shaft 15 and of the carrier shaft 27, the insertion of the freewheel 32 and the insertion of the mechanical transmissions 30 and 31.

Moreover, in the aforesaid road vehicle 1, in case of an electric traction (i.e. when the heat engine 5 is off), the clutches 17 and 18 can be opened since the pumps 25 and 26 of the gearbox 10 are rotated through the mechanical transmissions 30 and 31, both in the case of forward motion (where the carrier shaft 27 is rotated through the mechanical transmission 30) and in the case of reverse motion (where the carrier shaft 27 is rotated through the mechanical transmission 31).

Finally, the aforesaid road vehicle 1 is particularly efficient from the energetical point of view, since when the heat engine 5 is on, the mechanical energy absorbed by the pumps 25 and 26 of the gearbox 10 is normally taken directly by the drive shaft 6 of the heat engine 5 without any kind of electromechanical conversion.

The invention claimed is:

1. A road vehicle with an electric drive comprising:
   only one carrier shaft;
   at least one pump, which is operated by the one carrier shaft;
   at least one reversible electric machine having a shaft;
   a first mechanical transmission, which transmits the motion from the shaft of the electric machine to the one carrier shaft and is provided with a first freewheel;
   a second mechanical transmission, which is arranged in parallel to the first mechanical transmission, transmits the motion from the shaft of the electric machine to the carrier shaft, is provided with a second freewheel and reverses the direction of motion if compared to the first mechanical transmission;
   a heat engine provided with a drive shaft; and
   a third mechanical transmission, which is designed to transmit the motion from the drive shaft of the heat engine to the carrier shaft and is provided with a third freewheel;
   wherein the first mechanical transmission is completely separated and independent from the second mechanical transmission and does not have any common component with the second mechanical transmission.

2. A road vehicle according to claim 1, wherein the first freewheel is oppositely mounted if compared to the second freewheel.

3. A road vehicle according to claim 1, wherein the gear ratio determined by the third mechanical transmission is different from the gear ratio determined by the first mechanical transmission and by the second mechanical transmission.

4. A road vehicle according to claim 1, wherein the gear ratio determined by the third mechanical transmission is higher than the gear ratio determined by the first mechanical transmission and by the second mechanical transmission, so that, given the same inlet speed, the third mechanical transmission rotates the carrier shaft faster than the first mechanical transmission and the second mechanical transmission.

5. A road vehicle according to claim 1, wherein the third mechanical transmission is made up of a train of gear wheels and comprises a first gear wheel, which receives the motion from the drive shaft of the heat engine, and a second gear wheel, which meshes with the first gear wheel and is coupled to the carrier shaft through the third freewheel.

6. A road vehicle according to claim 5, wherein the third freewheel is built-in in the second gear wheel.

7. A road vehicle according to claim 1, wherein the first mechanical transmission is made up of a train of gear wheels and comprises a first gear wheel, which is coupled to the carrier shaft, and a second gear wheel, which meshes with the first gear wheel and is coupled to the shaft of the electric machine through the first freewheel.

8. A road vehicle according to claim 7, wherein the first freewheel is built-in in the second gear wheel.

9. A road vehicle according to claim 1, wherein the second mechanical transmission is made up of a train of gear wheels and comprises a first gear wheel, which is coupled to the carrier shaft, a second gear wheel, which is coupled to the shaft of the electric machine through the second freewheel and a third gear wheel, which is interposed between the first gear wheel and the second gear wheel.

10. A road vehicle according to claim 9, wherein the second freewheel is built-in in the second gear wheel.

11. A road vehicle according to claim 1, wherein the carrier shaft extends through the pump.

12. A road vehicle according to claim 1, wherein:
- the first mechanical transmission comprises a first train of gear wheels including first gear wheels; and
- the second mechanical transmission comprises a second train of gear wheels including second gear wheels, which are completely separated and independent from the first gear wheels.

13. A road vehicle according to claim 1, wherein:
- the first mechanical transmission comprises a first train of gear wheels, including a first gear wheel which is coupled to the carrier shaft, and a second gear wheel which meshes with the first gear wheel and is coupled to the shaft of the electric machine through the first freewheel; and
- the second mechanical transmission comprises a second train of gear wheels, including a third gear wheel which is separated and independent from the first gear wheel and is coupled to the carrier shaft, a fourth gear wheel, which is separated and independent from the second gear wheel and is coupled to the shaft of the electric machine through the second freewheel, and a fifth gear wheel, which is interposed between the third gear wheel and the fourth gear wheel.

\* \* \* \* \*